United States Patent
Gamet et al.

(10) Patent No.: US 8,984,416 B2
(45) Date of Patent: Mar. 17, 2015

(54) METHOD FOR SIMPLIFYING THE DISPLAY OF STATIONARY MEMBERS OF AN ONBOARD DATABASE

(75) Inventors: Pierre Gamet, Blagnac (FR); Jean-Louis Dalby, Gratens (FR); Nicolas Marty, Saint Sauveur (FR)

(73) Assignee: Thales, Neuilly-sur-Seine (FR)

( * ) Notice: Subject to any disclaimer, the term of this patent is extended or adjusted under 35 U.S.C. 154(b) by 830 days.

(21) Appl. No.: 12/674,812

(22) PCT Filed: Aug. 29, 2008

(86) PCT No.: PCT/EP2008/061375
§ 371 (c)(1), (2), (4) Date: Mar. 25, 2010

(87) PCT Pub. No.: WO2009/027498
PCT Pub. Date: Mar. 5, 2009

(65) Prior Publication Data
US 2010/0218114 A1    Aug. 26, 2010

(30) Foreign Application Priority Data
Aug. 31, 2007   (FR) .................................... 07 06131

(51) Int. Cl.
*G06F 3/03* (2006.01)
*G01C 23/00* (2006.01)

(52) U.S. Cl.
CPC ........................................ *G01C 23/00* (2013.01)
USPC ............................ 715/746; 715/700; 715/735

(58) Field of Classification Search
USPC ................................................. 715/746, 747
See application file for complete search history.

(56) References Cited

U.S. PATENT DOCUMENTS

| | | | | |
|---|---|---|---|---|
| 3,475,754 A * | 10/1969 | Scovill | ........................ | 342/451 |
| 5,086,396 A * | 2/1992 | Waruszewski, Jr. | .......... | 701/458 |
| 5,424,951 A * | 6/1995 | Nobe et al. | .................... | 701/532 |
| 5,916,297 A * | 6/1999 | Griffin et al. | ................. | 701/120 |
| 6,057,786 A * | 5/2000 | Briffe et al. | .................... | 340/975 |
| 6,112,141 A | 8/2000 | Briffe et al. | | |
| 6,466,235 B1 * | 10/2002 | Smith et al. | .................... | 715/771 |
| 6,744,396 B2 * | 6/2004 | Stone et al. | ..................... | 342/36 |
| 7,065,886 B2 * | 6/2006 | Segur | ............................ | 33/1 CC |
| 7,520,610 B2 * | 4/2009 | Stephane | ...................... | 351/205 |
| 7,881,867 B2 | 2/2011 | Lorido et al. | | |
| 8,020,113 B2 * | 9/2011 | Cabaret et al. | ................ | 715/771 |
| 8,249,762 B1 | 8/2012 | Flotte et al. | | |
| 8,249,799 B2 | 8/2012 | Flotte et al. | | |
| 8,275,499 B2 | 9/2012 | Coulmeau et al. | | |
| 8,436,750 B2 | 5/2013 | Fabre et al. | | |
| 2001/0056316 A1 * | 12/2001 | Johnson et al. | ................. | 701/14 |
| 2003/0132876 A1 * | 7/2003 | Block | ............................. | 342/65 |
| 2003/0137444 A1 * | 7/2003 | Stone et al. | ..................... | 342/30 |
| 2003/0179109 A1 * | 9/2003 | Chamas et al. | ............... | 340/973 |

(Continued)

*Primary Examiner* — Amy Ng
*Assistant Examiner* — Meseker Takele
(74) *Attorney, Agent, or Firm* — Baker & Hostetler LLP

(57) ABSTRACT

The invention is situated in the field of displaying on board an aircraft geostationary elements of the navigation database on a screen having different display resolutions for the purpose of this data display, and its subject is a method for simplifying the display of stationary elements of this onboard database. This method is characterized in that it consists in precalculating a "decluttering" during the process of producing the onboard database by meshing the Earth with a Cartesian grid oriented along the latitudes and longitudes of the Earth, and by allowing only the most pertinent obstacle to appear in each rectangle of this grid.

5 Claims, 2 Drawing Sheets

(56) References Cited

U.S. PATENT DOCUMENTS

| | | | |
|---|---|---|---|
| 2003/0193411 A1* | 10/2003 | Price | 340/973 |
| 2004/0122589 A1 | 6/2004 | Gibbs | |
| 2005/0283305 A1 | 12/2005 | Clark et al. | |
| 2006/0238376 A1* | 10/2006 | Khatwa | 340/970 |
| 2007/0022376 A1* | 1/2007 | Stephane | 715/700 |
| 2007/0031007 A1 | 2/2007 | Bitar | |
| 2007/0088492 A1 | 4/2007 | Bitar et al. | |
| 2007/0150117 A1 | 6/2007 | Bitar et al. | |
| 2007/0150121 A1 | 6/2007 | Bitar et al. | |
| 2007/0174005 A1 | 7/2007 | Bitar et al. | |
| 2007/0187554 A1 | 8/2007 | Bitar et al. | |
| 2007/0215745 A1 | 9/2007 | Fleury et al. | |
| 2007/0219705 A1 | 9/2007 | Bitar et al. | |
| 2007/0250223 A1 | 10/2007 | Francois et al. | |
| 2007/0276553 A1 | 11/2007 | Bitar et al. | |
| 2007/0285283 A1 | 12/2007 | Bitar et al. | |
| 2008/0004801 A1 | 1/2008 | Bitar et al. | |
| 2008/0039984 A1 | 2/2008 | Bitar et al. | |
| 2008/0046171 A1 | 2/2008 | Bitar et al. | |
| 2008/0154493 A1 | 6/2008 | Bitar et al. | |
| 2008/0174454 A1 | 7/2008 | Bitar et al. | |
| 2008/0177432 A1 | 7/2008 | Deker et al. | |
| 2008/0198041 A1 | 8/2008 | Sallier et al. | |
| 2008/0288169 A1 | 11/2008 | Meunier et al. | |
| 2008/0306639 A1 | 12/2008 | Fleury et al. | |
| 2008/0306680 A1 | 12/2008 | Marty et al. | |
| 2009/0006112 A1* | 1/2009 | White et al. | 705/1 |
| 2009/0125236 A1 | 5/2009 | Fontaine et al. | |
| 2009/0132103 A1 | 5/2009 | Marty et al. | |
| 2009/0138145 A1 | 5/2009 | Meunier et al. | |
| 2009/0157241 A1 | 6/2009 | Meunier et al. | |
| 2009/0201197 A1 | 8/2009 | Coulmeau et al. | |
| 2009/0326741 A1 | 12/2009 | Marty et al. | |
| 2010/0004801 A1 | 1/2010 | Flotte et al. | |
| 2010/0042273 A1 | 2/2010 | Meunier et al. | |
| 2010/0057276 A1 | 3/2010 | Marty et al. | |
| 2010/0066565 A1 | 3/2010 | Francois et al. | |
| 2011/0082605 A1* | 4/2011 | Coulmeau et al. | 701/14 |
| 2011/0161875 A1* | 6/2011 | Kankainen | 715/810 |

* cited by examiner

US 8,984,416 B2

METHOD FOR SIMPLIFYING THE DISPLAY OF STATIONARY MEMBERS OF AN ONBOARD DATABASE

CROSS-REFERENCE TO RELATED APPLICATIONS

This application is a National Stage of International patent application PCT/EP2008/061375, filed on Aug. 29, 2008, which claims priority to foreign French patent application No. FR 07 06131, filed on Aug. 31, 2007, the disclosures of which are hereby incorporated by reference in their entirety.

BACKGROUND OF THE INVENTION

The present invention relates to a method for simplifying the display of stationary elements of an onboard database.

The invention is situated in the field of displaying on board an aircraft geostationary elements originating from a database on a screen having different display resolutions.

When the display concerns geostationary data or fixed-format data such as natural obstacles, beacons, text information, graphs, etc., it may become illegible or at least difficult to use or even unusable.

In order to remedy these difficulties, there are "decluttering" algorithms which decide in real time on the type of display. However, this decluttering process requires a considerable computing power which exaggeratedly mobilizes the onboard computer that runs it, and which is therefore unavailable during this time for other tasks. Moreover, such algorithms may be nondeterministic if the density of information to be displayed is not limited, which may cause the program to drift in terms of computing time, and even to "crash" (stop without being able to restart of its own accord).

SUMMARY OF THE INVENTION

The subject of the present invention is a method for simplifying the display of stationary elements of an onboard Earth database on an aircraft screen having different display resolutions for the purpose of this data display, a method that can be used requiring computing power that is as small as possible.

The method according to the invention is a method for simplifying the display on an aircraft screen of stationary elements of an onboard database relating to the topography of the Earth and having several different display resolutions, and it is characterized in that it consists in precalculating the elements necessary for a simplification of the display during the process of producing the onboard database by associating with each fixed data item attributes indicating the display characteristics corresponding to each display mode or a range of display modes available, and, during the use of the database, displaying only the stationary elements corresponding to the display mode used while taking account of the corresponding attributes.

According to another feature of the invention, the simplification of the display is a "decluttering" consisting in displaying on the screen, for each display resolution, only the most pertinent element that can be distinguished on the screen amongst a group of elements in an elementary surface representative of the surface of the Earth.

According to another feature of the invention, the criterion of pertinence for each element and for each resolution is computed by dividing the globe of the Earth into rectangles assumed to be locally flat, by applying to each rectangle a Cartesian grid oriented along the latitudes and longitudes of the Earth, and allowing only the most pertinent obstacle to appear in each rectangle of this grid.

According to another feature of the invention, an isotropic decluttering step is carried out by marking as invisible, around each element, the elements that are less pertinent than it, thus erasing the edge effects due to dividing the globe into rectangles. Advantageously, the most pertinent element is marked as grouped.

According to another characteristic of the invention, the computation of the criterion of pertinence comprises a step of associating other attributes with each fixed data item, these attributes being at least one of the following parameters relating to the fixed data item in question, when the latter is a fixed obstacle: the altitude of its summit, height, volume, illumination.

According to another feature of the invention, the edge effects due to the juxtaposition of the rectangles assumed to be locally flat are erased by an offset mechanism which simulates a grid the origin of which would be at the coordinates point (latitude, longitude)=(0°,0°) or (N0°.E0°).

BRIEF DESCRIPTION OF THE DRAWINGS

The present invention will be better understood on reading the detailed description of an embodiment, taken as a non-limiting example and illustrated by the appended drawing, in which.

DETAILED DESCRIPTION

Figure 1:
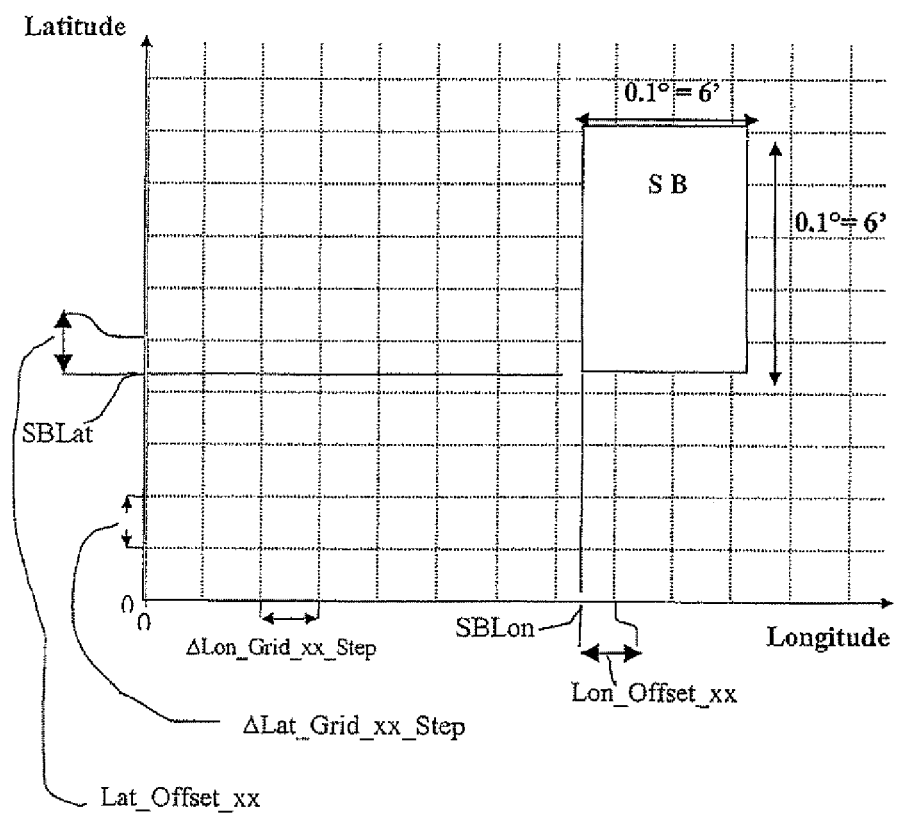
FIG. 1 is a simplified diagram showing how a display density grid is generated for applying the method of the invention.
Figure 2:
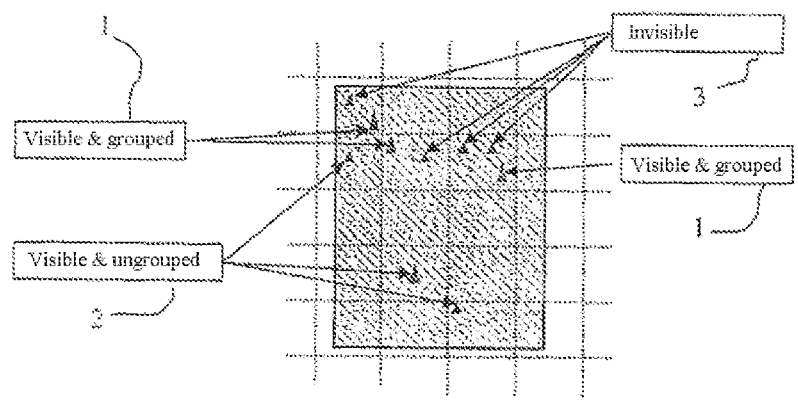
FIG. 2 is a simplified diagram showing the results of a first phase of display simplification using the method according to the present invention.

The method of the invention relates to the display on a viewing device having various display modes (different scales and resolutions) of data originating from an onboard database, which may equally be natural obstacles such as mountains, human buildings or fixed data such as text or graphs, for example navigation beacons or else waypoints, names of towns or of airports. To simplify the description below, all these kinds of data will be designated by the single term "fixed data".

The method of the invention is applied during the production of the onboard Earth database and in the first place consists in precomputing the elements necessary to the "decluttering".

Therefore, during the generation of the onboard database, the method of the invention consists in associating with each fixed data item a pair of attributes (visible yes/no, grouped yes/no), and this is done for each display resolution provided. These attributes are reflected by a bit field indicating the type of display (type of symbol, presence or absence of a symbol) corresponding to each display mode chosen by the user in flight. According to one mode of application of the method of the invention, N pairs of attributes are added to each fixed data item, each of these N pairs of attributes corresponding to one display resolution out of the N resolutions available. In the rest of the description, reference will be made to a display device with twelve different resolutions, therefore N=12.

In detail, the precomputation step of the method of the invention consists, before the Earth database is used on board, in supplementing its data as follows. In order to be able to process all the fixed data, it is first necessary to reference them relative to the surface of the Earth. For the purpose of producing the map of the surface of the Earth, it would be ideal to draw an orthonormal grid on the entire sphere of the Earth, but that is impossible. The Earth is therefore processed locally, in small pieces. Each small piece (in this instance called SB for "Secondary Block") can then be assumed to be flat, if it is small enough. It is then possible to furnish each SB with an orthonormal grid. This grid will be the grid used for decluttering.

The twelve pairs of attributes relating to each fixed data item are in this instance called "GRIDxx Display Type", i.e. display type of the rectangle in question of the grid. They comprise: a "visible/invisible" bit and a "grouped/ungrouped" bit, where xx=01 . . . to 12. In the case of fixed obstacles, the base also comprises the type of obstacle (illuminated or not, what color of illumination, etc.). If the obstacle is marked "invisible", it is not displayed. If it is marked "visible", the attributes comprise a "grouped or not" bit in order to decide whether it is necessary to display the symbol "illuminated isolated obstacle" or "groups of obstacles the most pertinent of which is illuminated". The minimum distance between two obstacles that can be displayed separately is the result of the two decluttering phases. This minimum distance depends on the values of the parameters GRID_xx_STEP and GRID_xx_RADIUS_FILTER explained below.

The method of the invention proceeds in two phases. It requires twelve pairs of parameters, stored in a configuration file, parameters such as:

GRID_xx_STEP, xx=01 . . . 12 for the first phase

GRID_xx_RADIUS_FILTER, xx=01 . . . 12 for the second phase

Described below is the process of filling each of the twelve pairs of attributes (visible yes/no, grouped yes/no bits) for each fixed element. This process is repeated twelve times in order to fill, for each fixed element of the database, the twelve pairs of attributes:

"GRID01_Display_Type", "GRID02_Display_Type" . . . "GRID12_Display_Type".

The process of the invention essentially comprises two phases, as explained below.
A) First Phase:

The first phase consists in reducing the occupation density of the grid by filling the "visible/invisible" and "grouped/ungrouped" fields for each obstacle of the Earth before moving on to the second phase.

Accordingly, this first phase consists in dividing the Earth into an even grid, as shown in dotted lines in FIG. 1. In each rectangle of this grid, or box, only one obstacle (or other fixed element) is displayed, namely the most pertinent. If there are other obstacles (or fixed elements) in this box, the most significant obstacle is assigned the designation "grouped", and the other obstacles are designated "invisible". The step of the even grid is given in meters by the parameter "GRID_xx_STEP". For example, the step is approximately 100 m when the total distance represented on the screen is 20 nm (nm=nautical miles). This step may be adjusted to 1000 m if the total distance represented on the screen is 200 nm.

The method of the invention deals with the obstacles of each box one after the other.

For each box of the Earth, the following computations are made:

1) The value of "GRID_xx_STEP", expressed for example in meters, is converted as follows (where Lat=latitude and Lon=longitude):

$$\Delta Lat\_Grid\_xx\_Step = GRID\_xx\_STEP/1852/60$$

$$\Delta Lon\_Grid\_xx\_Step = GRID\_xx\_STEP/1852/60/Cos(SBLat+0.05),$$

these values being expressed in degrees
(it is assumed here that the mean latitude of SB is SBLat+ 0.05°=the latitude of the center of the current box).
2) The grid is generated as follows (see FIG. 1):
    Scale of the longitudes divided into steps equal to "ΔLon_Grid_xx_Step"
    Scale of the latitudes divided into steps equal to "ΔLat_Grid_xx_Step"
3) In order to reduce the edge effects due to the juxtaposition of the "Secondary Blocks", the origin of the grid is chosen to be outside the SB in question. In order to simplify the computations, the origin is chosen to be the point of coordinates (latitude, longitude)=(0°,0°). Two offset values are necessary in order to determine the beginning of the grid inside the SB in question and the following algorithm is applied:

```
If SBLat > 0
Then Lat_Offset_xx = (1 − Dec(SBLat/ΔLat_Grid_xx_Step) ) *
ΔLat_Grid_xx_Step
Else Lat_Offset_xx = Dec(SBLat/ΔLat_Grid_xx_Step) *
ΔLat_Grid_xx_Step
If SBLon > 0
Then Lon_Offset_xx = (1 − Dec(SBLon/ΔLon_Grid_xx_Step))*
ΔLon_Grid_xx_Step
Else Lon_Offset_xx = Dec(SBLon/ΔLon_Grid_xx_Step) *
ΔLon_Grid_xx_Step
```

In this algorithm:
    SBLon: longitude in degrees of the south-west corner of the SB
    SBLat: latitude in degrees of the south-west corner of the SB
    Dec(x): absolute value of the decimal portion of x. For example: Dec(1,2)=Dec(−1,2)=0,2.
    Each obstacle of the database is contained exactly in:
    A single SB (all that is considered here is the center of the obstacle, and not its horizontal extent),
    A rectangle of coordinates (ΔLatitude_Grid_xx_Step, ΔLongitude_Grid_xx_Step) delimited by dotted lines in FIG. 1.

For each obstacle of the current SB, the "visible/invisible" bit of the formula "GRIDxx Display Type" is forced to:
    1 if the obstacle is the most pertinent in the box defined by the intersection between the current SB and the rectangle:

(ΔLatitude_Grid_xx_Step, ΔLongitude_Grid_xx_Step)

0 otherwise:
For each obstacle of the current SB, the "grouped/ungrouped" bit of the formula "GRIDxx Display Type" is forced to:
    1 if there are at least two obstacles in the box defined by the intersection between the current SB and the rectangle:

(ΔLatitude_Grid_xx_Step, ΔLongitude_Grid_xx_Step)

0 otherwise.
B) Second Phase
    The second phase consists in carrying out an overall isotropic post-decluttering. In detail, this process is applied as follows.

For each obstacle A of the database, such as:
  if Bit0_visible=1 in the field "GRIDxx_Display_Type field" of A AND
  if there is an obstacle B different from a and its distance to A is less than "GRID_xx_RADIUS_FILTER",
  the bits relating to "visible/invisible" and "grouped/ungrouped" are forced to take the following values:
    if B is more pertinent than A:
    Bit0_visible is forced to 0 in the field "GRIDxx_Display_Type" of A
    Bit1_grouped is forced to 1 in the field "GRIDxx_Display_Type" of B
    if ObstA is more pertinent than ObstB:
    Bit1_grouped is forced to 1 in the field "GRIDxx_Display_Type" of A
    Bit0_visible is forced to 0 in the field "GRIDxx_Display_Type" of B.

Figure 3:
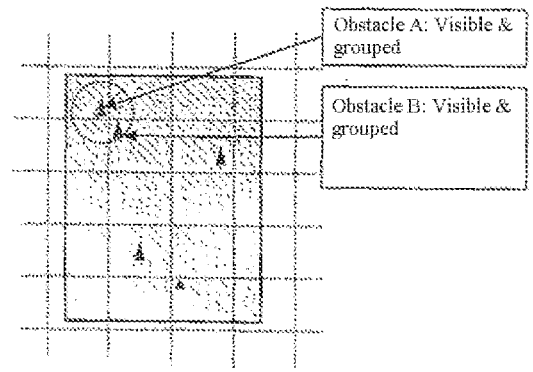
FIG. 3 is a simplified diagram showing the overall isotropic result of applying the method of the invention.

This is illustrated in FIG. 3, showing the result of applying the second phase. After this application, only the most pertinent visible and grouped obstacles between A and B appear. In this figure, the filter has been drawn in a dotted line, which is a circle centered on A and with a radius equal to "GRID_xx_RADIUS_FILTER". In this example, B is visible and grouped and inside this filter.

The invention claimed is:

1. A method for simplifying a display on an aircraft screen of stationary elements of an onboard database relating to the topography of the earth and having several different display resolutions, the method comprising:
    precalculating the stationary elements necessary for a simplification of the display while producing the onboard database by associating attributes indicating display characteristics corresponding to each display mode or a range of available display modes with each fixed data item; and
    displaying, during use of the onboard database, only the stationary elements corresponding to the display mode used while taking account of the corresponding attributes indicating the display characteristics of the display mode,
    wherein, before use of the onboard database, a pertinence criterion for each stationary element and for each resolution is computed by dividing a globe of the earth into rectangles assumed to be locally flat, by applying to each rectangle a Cartesian grid oriented along the latitudes and longitudes of the earth, and, in each rectangle of the Cartesian grid, only the stationary element with the greatest pertinence criterion of any stationary elements within the rectangle is allowed to be displayed, and
    wherein the simplification of the display comprises an isotropic decluttering comprising displaying, on the display and for each display resolution, only the stationary element with the greatest pertinence criterion that can be distinguished on the display among a group of stationary elements in an elementary surface representative of the surface of the earth.

2. The method as claimed in claim 1, wherein the isotropic decluttering comprises marking as invisible, around each stationary element, the stationary elements that have a pertinence criterion lower than the stationary element, thereby erasing edge effects due to dividing the globe into rectangles.

3. The method as claimed in claim 2, wherein a stationary element not marked as invisible is marked as grouped.

4. The method as claimed in claim 1, wherein computing the pertinence criterion comprises associating other attributes with each fixed data item, the other attributes being at least one of an altitude of a summit, a height, a volume, or an illumination of the fixed data item.

5. The method as claimed in claim 2, wherein edge effects due to juxtaposition of the rectangles assumed to be locally flat are erased by an offset mechanism which simulates a grid originating at the point (N0°.E0°).

* * * * *